US010090978B2

(12) United States Patent
Sun et al.

(10) Patent No.: US 10,090,978 B2
(45) Date of Patent: Oct. 2, 2018

(54) REFERENCE SIGNAL AND SIGNALLING DESIGN FOR NON-ORTHOGONAL MULTIPLE ACCESS WITH LEGACY USER EQUIPMENT AS A BASE LAYER

(71) Applicant: QUALCOMM Incorporated, San Diego, CA (US)

(72) Inventors: Jing Sun, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 15/177,075

(22) Filed: Jun. 8, 2016

(65) Prior Publication Data

US 2017/0012754 A1 Jan. 12, 2017

Related U.S. Application Data

(60) Provisional application No. 62/191,170, filed on Jul. 10, 2015.

(51) Int. Cl.
*H04W 72/08* (2009.01)
*H04L 5/00* (2006.01)
(Continued)

(52) U.S. Cl.
CPC .......... *H04L 5/0048* (2013.01); *H04L 27/183* (2013.01); *H04L 27/3488* (2013.01);
(Continued)

(58) Field of Classification Search
CPC . H04L 5/0048; H04L 27/183; H04L 27/3488; H04L 5/0001; H04L 5/0051;
(Continued)

(56) References Cited

U.S. PATENT DOCUMENTS

2010/0120360 A1* 5/2010 Haustein .............. H04B 7/2606
455/15
2012/0057641 A1* 3/2012 Sadough ............... H04L 1/0066
375/242

(Continued)

FOREIGN PATENT DOCUMENTS

WO 2014122994 A1 8/2014

OTHER PUBLICATIONS

International Search Report and Written Opinion—PCT/US2016/036736—ISA/EPO—dated Aug. 1, 2016.

*Primary Examiner* — Luat Phung
(74) *Attorney, Agent, or Firm* — Arent Fox, LLP

(57) ABSTRACT

In accordance with various aspect of the present disclosure, apparatus may transmit a first data resource element for a first UE on a base layer. The first UE is unconfigured for NOMA communication. The apparatus may also transmits data for a second UE on an enhancement layer. The second UE is configured for NOMA communication. Additionally, the base layer is overlayed with the enhancement layer. The reference signal may include a cell specific reference signal. The apparatus may be further configured to receive a traffic power ratio for the second UE to be followed by the second UE when the second UE is a base layer UE in a NOMA communication.

23 Claims, 13 Drawing Sheets

(51) Int. Cl.
*H04L 27/18* (2006.01)
*H04L 27/34* (2006.01)
*H04W 52/34* (2009.01)
*H04W 52/32* (2009.01)

(52) U.S. Cl.
CPC ......... *H04W 52/346* (2013.01); *H04L 5/0001* (2013.01); *H04L 5/0051* (2013.01); *H04L 5/0073* (2013.01); *H04W 52/325* (2013.01)

(58) Field of Classification Search
CPC .. H04L 5/0073; H04W 52/346; H04W 52/325
See application file for complete search history.

(56) References Cited

U.S. PATENT DOCUMENTS

| | | | |
|---|---|---|---|
| 2012/0224592 A1* | 9/2012 | Henry | H04N 21/234327 370/474 |
| 2013/0196700 A1* | 8/2013 | Tiirola | H04J 11/004 455/501 |
| 2014/0050279 A1 | 2/2014 | Kishiyama | |
| 2015/0139293 A1* | 5/2015 | Stanwood | H04L 27/01 375/230 |
| 2015/0171947 A1 | 6/2015 | Sun et al. | |
| 2016/0029350 A1 | 1/2016 | Kishiyama et al. | |

* cited by examiner

REFERENCE SIGNAL AND SIGNALLING DESIGN FOR NON-ORTHOGONAL MULTIPLE ACCESS WITH LEGACY USER EQUIPMENT AS A BASE LAYER

CROSS-REFERENCE TO RELATED APPLICATION(S)

This application claims the benefit of U.S. Provisional Application Ser. No. 62/191,170, entitled "REFERENCE SIGNAL AND SIGNALLING DESIGN FOR NON-ORTHOGONAL MULTIPLE ACCESS WITH LEGACY USER EQUIPMENT AS A BASE LAYER" and filed on Jul. 10, 2015, which is expressly incorporated by reference herein in its entirety.

BACKGROUND

Field

The present disclosure relates generally to communication systems, and more particularly, to a Non-Orthogonal Multiple Access communication systems Background Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer program product, and an apparatus are provided. The apparatus transmits a first data resource element for a first User Equipment (UE) on a base layer. The first UE is unconfigured for Non-Orthogonal Multiple Access (NOMA) communication. The apparatus also transmits data for a second UE on an enhancement layer. The second UE is configured for NOMA communication. Additionally, the base layer is overlaid with the enhancement layer. The apparatus transmits a reference signal. It may be useful for Non-Orthogonal Multiple Access (NOMA) to function with legacy UEs.

In another aspect of the disclosure, a method, a computer program product, and an apparatus are provided. The apparatus receives a first data resource element on a base layer. The first data resource element is configured for a second UE. The second UE is not preconfigured for NOMA communication. The apparatus also receives data for the first UE on an enhancement layer. The base layer is overlaid with the enhancement layer. Additionally, the apparatus receives a reference signal. The apparatus also decodes both the first data resource element for the second UE and the data for the first UE.

In an aspect of the disclosure, a method, a computer program product, and an apparatus are provided. The apparatus transmits a first data resource element for a first User Equipment (UE) on a base layer. The first UE is unconfigured for Non-Orthogonal Multiple Access (NOMA) communication. The apparatus also transmits data for a second UE on an enhancement layer. The second UE is configured for NOMA communication. Additionally, the base layer is overlaid with the enhancement layer. The apparatus transmits a reference signal.

In another aspect of the disclosure, a method, a computer program product, and an apparatus are provided. The apparatus receives a first data resource element on a base layer. The first data resource element is configured for a second UE. The second UE is not preconfigured for NOMA communication. The apparatus also receives data for the first UE on an enhancement layer. The base layer is overlaid with the enhancement layer. Additionally, the apparatus receives a reference signal. The apparatus also decodes both the first data resource element for the second UE and the data for the first UE.

In another aspect of the disclosure, a method of NOMA communications at a base station includes transmitting a first data resource element for a first UE on a base layer. The first UE is unconfigured for NOMA communication. The method includes transmitting data for a second UE on an enhancement layer. The second UE is configured for NOMA communication. The base layer is overlayed with the enhancement layer. The method also includes transmitting a reference signal.

In another aspect, the reference signal may include a cell specific reference signal.

Another aspect may further include transmitting a first UE traffic power ratio to be followed by the first UE when the first UE is a base layer UE in a NOMA communication.

Another aspect may further include transmitting a signal to restrict the first UE to a modulation and coding scheme that uses Quadrature Phase Shift Keying (QPSK).

In another aspect, the data for the second UE may include a second data resource element for the second UE In another aspect, the reference signal may include a demodulation-reference signal.

In another aspect, the demodulation-reference signal may include a demodulation-reference signal for the first UE.

In another aspect, a traffic power ratio of the first UE relative to the demodulation-reference signal of the first UE may be 0 dB.

In another aspect, the demodulation-reference signal may include an enhancement layer demodulation-reference signal for the second UE and a demodulation-reference signal for the first UE. The enhancement layer demodulation-reference signal and the demodulation-reference signal for the first UE overlap.

In another aspect, a traffic power ratio for the first UE may be 0 dB over the demodulation reference signal and the traffic power ratio of the second UE may be 0 dB over the enhancement layer demodulation reference signal.

Another aspect may further include determining enhancement layer power from a base layer power using a modulation order pair when a spatial layer is shared by the first UE and the second UE, when a combined constellation to be uniform is restricted. The first UE may include a base layer UE and the second UE may include an enhancement layer UE.

Another aspect may further include calculating an enhancement layer only spatial layer power by determining a number of base layer spatial layers, determining a number of enhancement layer spatial layers, determining a total base layer power based on a traffic power ratio for the base layer, calculating the enhancement layer power on each shared spatial layer with a given modulation order pair of that spatial layer, computing a total enhancement layer power in the shared spatial layers, computing a total enhancement layer power across all layers from a second UE traffic power ratio. A difference between the total enhancement layer power in the shared spatial layers and the total enhancement layer power across all layers from the second UE traffic power ratio includes a total enhancement layer power available to the enhancement layer only spatial layers. The aspect also includes uniformly splitting the total enhancement layer power available to the enhancement layer only spatial layers between all enhancement layer only spatial layers.

Another aspect may further include determining a power for the enhancement layer based on an enhancement layer traffic power ratio using the enhancement layer traffic power ratio power may be split across all spatial layers for the enhancement layer evenly.

In another aspect, a method of NOMA communications at a first UE configured for NOMA communication includes receiving a first data resource element on a base layer. The first data resource element is configured for a second UE. The second UE is not preconfigured for NOMA communication. The method includes receiving data for the first UE on an enhancement layer. The base layer is overlayed with the enhancement layer. The method includes receiving a reference signal and decoding both the first data resource element for the second UE and the data for the first UE.

In another aspect, the reference signal may include a cell specific reference signal.

Another aspect may further include receiving a traffic power ratio of the first UE to be followed by the first UE when the first UE is a base layer UE in a NOMA communication.

Another aspect may further include, demodulating the first data resource element using the cell specific reference signal and demodulating the data for the second UE using a separate traffic power ratio separate from the traffic power ratio of the first UE.

In another aspect, the data for the second UE may include a second data resource element for the second UE.

In another aspect, the reference signal may include a demodulation-reference signal.

In another aspect, the demodulation-reference signal may be a demodulation-reference signal for the first UE.

In another aspect, the demodulation-reference signal may include an enhancement layer demodulation-reference signal for the first UE and a demodulation-reference signal for the second UE. The enhancement layer demodulation-reference signal for the first UE and the demodulation-reference signal for the second UE may overlap. An aspect may further include using the enhancement layer demodulation-reference signal and the demodulation-reference signal for the second UE for at least one of channel estimation or interference estimation.

Another aspect may further include performing an interference cancellation.

In another aspect, a base station for NOMA communications includes means for transmitting a first data resource element for a first UE on a base layer. The first UE may be unconfigured for NOMA communication. The method includes means for transmitting data for a second UE on an enhancement layer. The second UE may be configured for NOMA communication. The base layer may be overlayed with the enhancement layer. The method may also include means for transmitting a reference signal.

In another aspect, the reference signal may include a cell specific reference signal.

Another aspect may further include means for transmitting a traffic power ratio for the first UE to be followed by the first UE when the first UE is a base layer UE in a NOMA communication.

Another aspect may further include means for transmitting a signal to restrict the first UE to a modulation and coding scheme that uses QPSK.

In another aspect, the data for the second UE may include a second data resource element for the second UE.

In another aspect, the reference signal may include a demodulation-reference signal.

In another aspect, the demodulation-reference signal may include a demodulation-reference signal for the first UE.

In another aspect, a traffic power ratio of the first UE relative to the demodulation-reference signal for the first UE may be 0 dB.

In another aspect, the demodulation-reference signal may include an enhancement layer demodulation-reference signal for the second UE and a legacy demodulation-reference signal for the first UE. The enhancement layer demodulation-reference signal and the demodulation-reference signal for the first UE may overlap.

In another aspect, a traffic power ratio for the first UE may be 0 dB over demodulation reference signal and the traffic power ratio of the second UE may be 0 dB over the enhancement layer demodulation reference signal.

Another aspect may further include means for determining enhancement layer power from a base layer power using a modulation order pair when a spatial layer is shared by a first UE and a second UE, when a combined constellation to be uniform is restricted. The first UE may include a base layer UE and the second UE may include an enhancement layer UE.

Another aspect may include means for calculating an enhancement layer spatial layer power including means for determining a number of base layer spatial layers, means for determining a number of enhancement layer spatial layers, means for determining a total base layer power based on a traffic power ratio for the base layer, means for calculating the enhancement layer power on each shared spatial layer with given modulation order pair of that spatial layer, means for computing a total enhancement layer power in the shared spatial layers, means for computing a total enhancement layer power across all layers from a second UE traffic power ratio. A difference between the total enhancement layer power in the shared spatial layers and the total enhancement layer power across all layers from the second UE traffic power ratio may include a total enhancement layer power available to the enhancement layer only spatial layers. The aspect may further include means for uniformly splitting the total enhancement layer power available to the enhancement layer only spatial layers between all enhancement layer only spatial layers.

Another aspect may further include means for determining a power for the enhancement layer based on an enhancement layer traffic power ratio using the enhancement layer traffic power ratio power may be split across all spatial layers for the enhancement layer evenly.

In another aspect, an apparatus including a first UE configured for NOMA communication includes means for receiving a first data resource element on a base layer. The first data resource element is configured for a second UE. The second UE is not preconfigured for NOMA communication. The apparatus includes means for receiving data for the first UE on an enhancement layer. The base layer is overlayed with the enhancement layer. The apparatus includes means for receiving a reference signal and means for decoding both the first data resource element for the second UE and the data for the first UE.

In an aspect, the reference signal may include a cell specific reference signal.

An aspect may further include means for receiving a traffic power ratio for the second UE to be followed by the second UE when the second UE is a base layer UE in a NOMA communication.

An aspect may further include means for demodulating the first data resource element using the cell specific reference signal and demodulating the data for a second UE using a separate traffic power ratio separate from the traffic power ratio for the second UE.

In an aspect, the data for the second UE may include a second data resource element for the second UE.

In an aspect, the reference signal may include a demodulation-reference signal.

In an aspect, the demodulation-reference signal may include a demodulation-reference signal for the first UE.

In an aspect, the demodulation-reference signal may include an enhancement layer demodulation-reference signal and a demodulation-reference signal for the second UE. The enhancement layer demodulation-reference signal and the demodulation-reference signal for the second UE may overlap. The apparatus may further include means for using the enhancement layer demodulation-reference signal and the demodulation-reference signal for the second UE for at least one of channel estimation or interference estimation.

An aspect may further include means for performing an interference cancellation.

In an aspect, a base station for NOMA communications includes a memory and at least one processor coupled to the memory. The processor is configured to transmit a first data resource element for a first UE on a base layer. The first UE is unconfigured for NOMA communication. The processor is configured to transmit data for a second UE on an enhancement layer. The second UE is configured for NOMA communication. The base layer is overlayed with the enhancement layer. The processor is configured to transmit a reference signal.

In an aspect, the reference signal may include a cell specific reference signal.

In an aspect, the processor may be further configured to transmit a traffic power ratio for the first UE to be followed by the first UE when the first UE is a base layer UE in a NOMA communication.

In an aspect, the processor may be further configured to transmit a signal to restrict the first UE to a modulation and coding scheme that uses QPSK.

In an aspect, the data for the second UE may include a second data resource element for the second UE.

In an aspect, the reference signal may include a demodulation-reference signal.

In an aspect, the demodulation-reference signal may include a demodulation-reference signal for the first UE.

In an aspect, a traffic power ratio of the first UE divided by a demodulation-reference signal for the first UE may be 0 dB.

In an aspect, the demodulation-reference signal may include an enhancement layer demodulation-reference signal for the second UE and a demodulation-reference signal for the first UE. The enhancement layer demodulation-reference signal and the demodulation-reference signal for the first UE may overlap.

In an aspect, a traffic power ratio for the first UE may be 0 dB over demodulation reference signal and the traffic power ratio of the second UE may be 0 dB over an enhancement layer demodulation reference signal.

In an aspect, the processor may be further configured to determine enhancement layer power from a base layer power using a modulation order pair when a spatial layer is shared by a first UE and a second UE, when a combined constellation to be uniform is restricted. The first UE may include a base layer UE and the second UE may include an enhancement layer UE.

In an aspect, the processor is further configured to calculate an enhancement layer spatial layer power by determining a number of base layer spatial layers, determining a number of enhancement layer spatial layers, determining a total base layer power based on a traffic power ratio for the base layer, calculating the enhancement layer power on each shared spatial layer with given modulation order pair of that spatial layer, computing a total enhancement layer power in the shared spatial layers, and computing a total enhancement layer power across all layers from a second UE traffic power ratio. A difference between the total enhancement layer power in the shared spatial layers and the total enhancement layer power across all layers from the second UE traffic power ratio may include a total enhancement layer power available to the enhancement layer only spatial layers. The aspect may further include uniformly splitting the total enhancement layer power available to the enhancement layer only spatial layers between all enhancement layer only spatial layers.

An aspect may further include determining a power for the enhancement layer based on an enhancement layer traffic power ratio using the enhancement layer traffic power ratio power may be split across all spatial layers for the enhancement layer evenly.

In an aspect, an apparatus including a first UE is configured for NOMA communication. The first UE includes a memory and at least one processor coupled to the memory. The processor is configured to receive a first data resource element on a base layer. The first data resource element may be configured for a second UE. The second UE is not preconfigured for NOMA communication. The processor is configured to receive data for the first UE on an enhancement layer. The base layer may be overlayed with the enhancement layer. The processor is configured to receive a reference signal and decode both the first data resource element for the second UE and the data for the first UE.

In an aspect, the reference signal may include a cell specific reference signal.

In an aspect, the processor may be further configured to receive a traffic power ratio for the second UE to be followed by the second UE when the second UE is a base layer UE in a NOMA communication.

In an aspect, the processor may be further configured to demodulate the first data resource element using the cell specific reference signal and demodulating the data for a second UE using a separate traffic power ratio separate from the traffic power ratio for the first UE.

In an aspect, the data for the second UE may include a second data resource element for the second UE.

In an aspect, the reference signal may include a demodulation-reference signal.

In an aspect, the demodulation-reference signal may include a demodulation-reference signal for the first UE.

In an aspect, the demodulation-reference signal may include an enhancement layer demodulation-reference signal for the first UE and a demodulation-reference signal for the second UE. The enhancement layer demodulation-reference signal for the first UE and the demodulation-reference signal for the second UE may overlap. The processor may be further configured to use the enhancement layer demodulation-reference signal and the demodulation-reference signal for the second UE for at least one of channel estimation or interference estimation.

In an aspect, the processor may be further configured to perform an interference cancellation.

In an aspect, a computer-readable medium stores computer executable code for wireless communication. The computer-readable medium includes code for transmitting a first data resource element for a first UE on a base layer. The first UE is unconfigured for NOMA communication. The computer-readable medium includes code for transmitting data for a second UE on an enhancement layer. The second UE is configured for NOMA communication. The base layer is overlayed with the enhancement layer. The computer-readable medium includes code for transmitting a reference signal.

In an aspect, a computer-readable medium stores computer executable code for wireless communication. The computer-readable medium includes code for receiving a first data resource element on a base layer. The first data resource element may be configured for a second UE. The second UE may be unconfigured for NOMA communication. The computer-readable medium may include code for receiving data for a first UE on an enhancement layer. The base layer may be overlayed with the enhancement layer. The computer-readable medium may include code for receiving a reference signal and decoding both the first data resource element for the second UE and the data for the first UE.

In another aspect, the demodulation-reference signal may include a first UE enhancement layer demodulation-reference signal and a second UE demodulation-reference signal. The first UE enhancement layer demodulation-reference signal for the first UE and the second UE demodulation-reference signal may overlap.

In an aspect, the method may further including using the first UE enhancement layer demodulation-reference signal and the second UE demodulation-reference signal for at least one of channel estimation or interference estimation.

In another aspect, the demodulation-reference signal may include a second UE enhancement layer demodulation-reference signal and a first UE demodulation-reference signal.

Another aspect may further include determining enhancement layer power from a base layer power using a modulation order pair when a spatial layer is shared by the first UE and the second UE, when a combined constellation to be uniform is restricted. The first UE may include a base layer UE and the second UE may include an enhancement layer UE.

In another aspect, the reference signal may include a cell specific reference signal.

Another aspect may further include receiving a second UE traffic power ratio to be followed by the second UE when the second UE is a base layer UE in a NOMA communication.

Another aspect may further include demodulating the first data resource element using the cell specific reference signal and demodulating second data for the second UE using a separate traffic power ratio separate from the second UE traffic power ratio.

In another aspect, the reference signal may include a demodulation-reference signal.

In another aspect, a first UE traffic power ratio relative to a first UE demodulation-reference signal may be 0 dB.

In another aspect, a traffic power ratio for the first UE may be 0 dB over the demodulation reference signal and the second UE traffic power ratio is 0 dB over the enhancement layer demodulation reference signal.

In another aspect, the demodulation-reference signal may include a first UE demodulation-reference signal.

In another aspect, a processor may be further configured to determine enhancement layer power from a base layer power using a modulation order pair when a spatial layer is shared by the first UE and the second UE, when a combined constellation to be uniform is restricted. The first UE may include a base layer UE and the second UE may include an enhancement layer UE.

In another aspect, a processor may be further configured to demodulate the first data resource element using the cell specific reference signal and demodulate second data for a second UE using a separate traffic power ratio separate from the second UE traffic power ratio.

In another aspect, a method of NOMA communications at a first UE that is configured for NOMA communication includes receiving a first data resource element on a base layer. The first data resource element may be configured for a second UE. The second UE is not be preconfigured for NOMA communication. The method also includes receiving data for the first UE on an enhancement layer. The base layer may be overlayed with the enhancement layer. Additionally, the method also includes receiving a reference signal and canceling the first data resource element for the second UE and decoding the data for the first UE.

In another aspect, a base station for NOMA communications includes a memory and at least one processor coupled to the memory. The processor is configured to transmit a first data resource element for a first UE on a base layer. The first UE is unconfigured for NOMA communication. The processor is also configured to transmit data for a second UE on an enhancement layer. The second UE may be configured for NOMA communication. The base layer is overlayed with the enhancement layer. Additionally, the processor is transmit a reference signal.

In another aspect, an apparatus is a first UE configured for NOMA communication. The first UE includes a memory and at least one processor coupled to the memory. The processor is configured to receive a first data resource element on a base layer. The first data resource element is configured for a second UE. The second UE is not preconfigured for NOMA communication. Additionally, the processor is configured to receive data for the first UE on an enhancement layer. The base layer is overlayed with the enhancement layer. The processor is also configured to receive a reference signal and cancel the first data resource element for the second UE and decode the data for the first UE To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
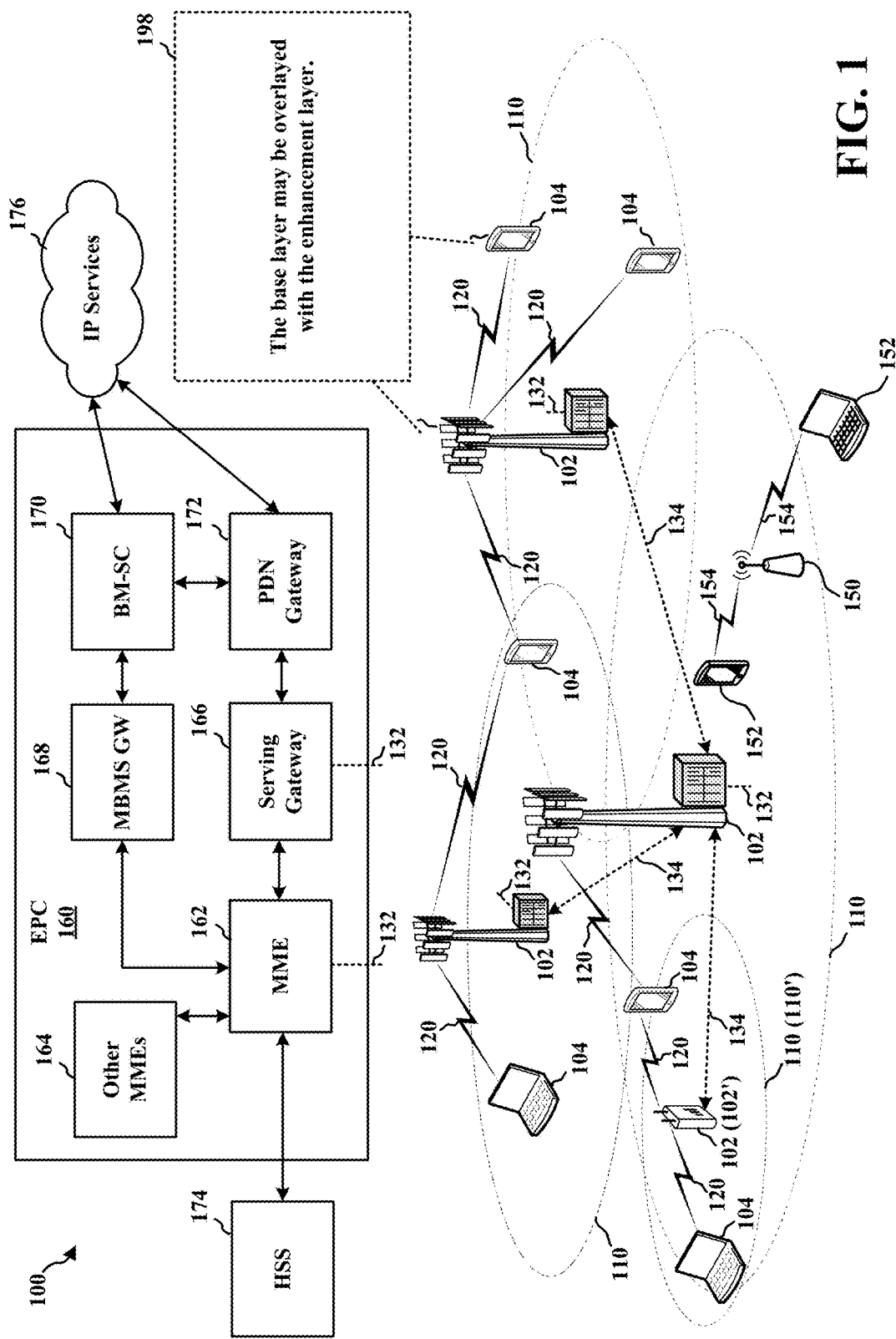
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to transmit a first data resource element for a first UE on a base layer. The first UE may be unconfigured for NOMA communication. The eNB 102 may transmit data for a second UE on an enhancement layer. The second UE may be configured for NOMA communication. The base layer may be overlayed with the enhancement layer. Additionally, the eNB 102 may transmit a reference signal (198).

Referring again to FIG. 1, in certain aspects, the UE 104 may be configured to receive a first data resource element on a base layer, the first data resource element configured for a second UE. The second UE may not be preconfigured for NOMA communication. The UE 104 may be configured to receive data for the first UE on an enhancement layer. The base layer may be overlayed with the enhancement layer. The UE 104 may be configured to receive a reference signal and cancel the first data resource element for the second UE and decode the data for the first UE (198).

Figures 2A, 2B, 2C, 2D:
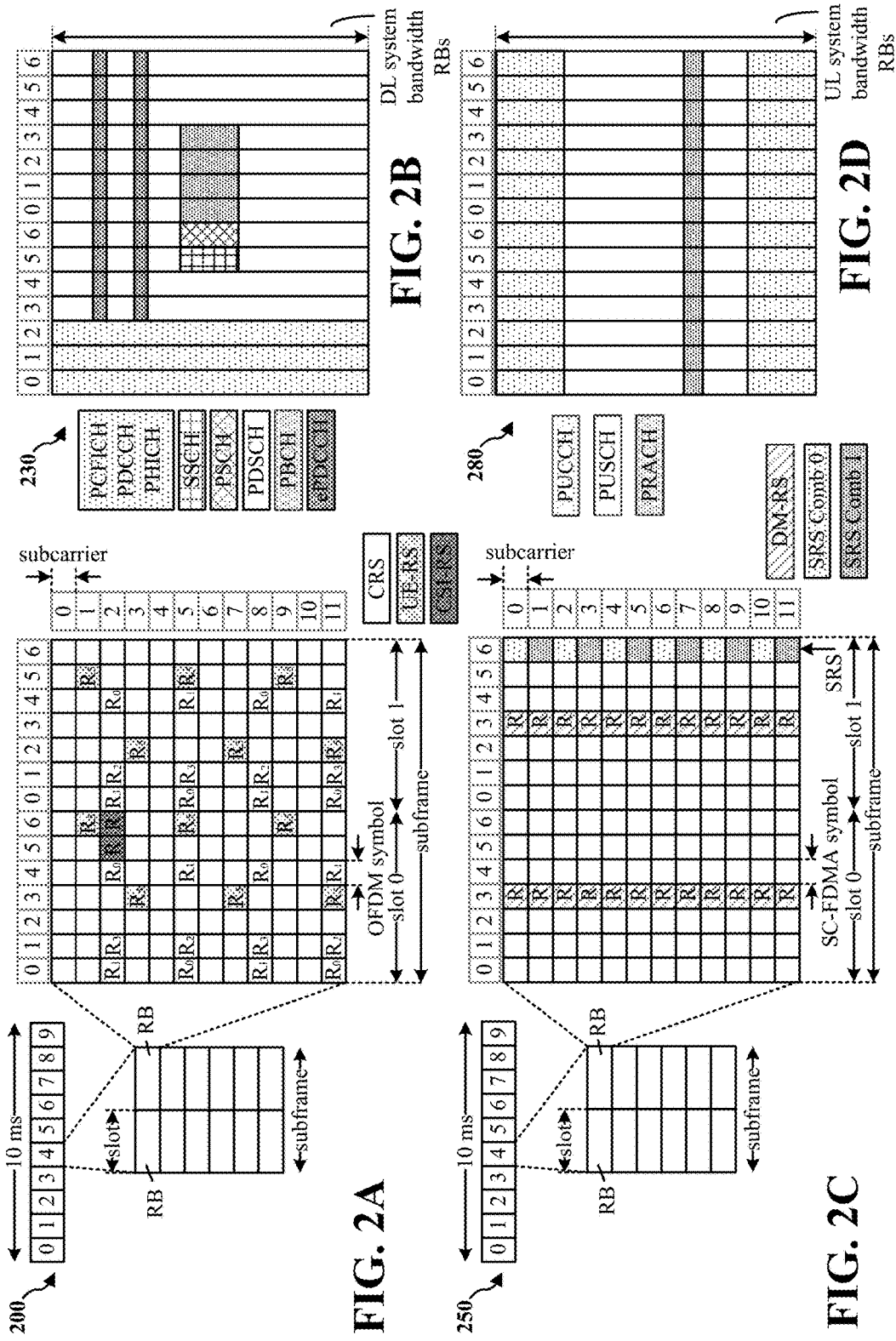
FIGS. 2A, 2B, 2C, and 2D are diagrams illustrating LTE examples of a DL frame structure, DL channels within the DL frame structure, a UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of a UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0 and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgment (ACK)/negative ACK (NACK) feedback based on the physical uplink shared channel (PUSCH). The primary synchronization channel (PSCH) is within symbol 6 of slot 0 within subframes 0 and 5 of a frame and carries a primary synchronization signal (PSS) that is used by a UE to determine subframe timing and a physical layer identity. The secondary synchronization channel (SSCH) is within symbol 5 of slot 0 within subframes 0 and 5 of a frame and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs) and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within a UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
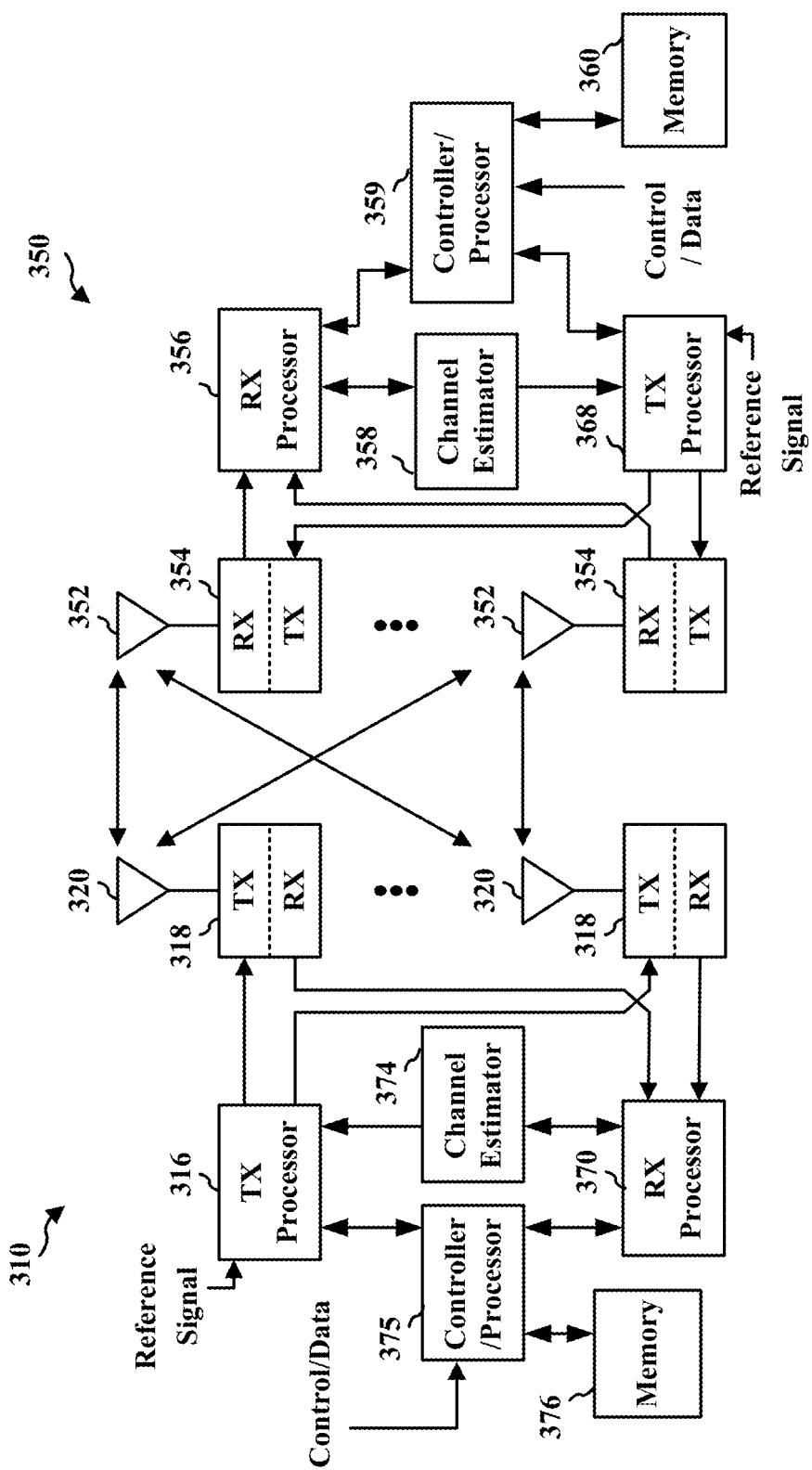
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier and the reference signal are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
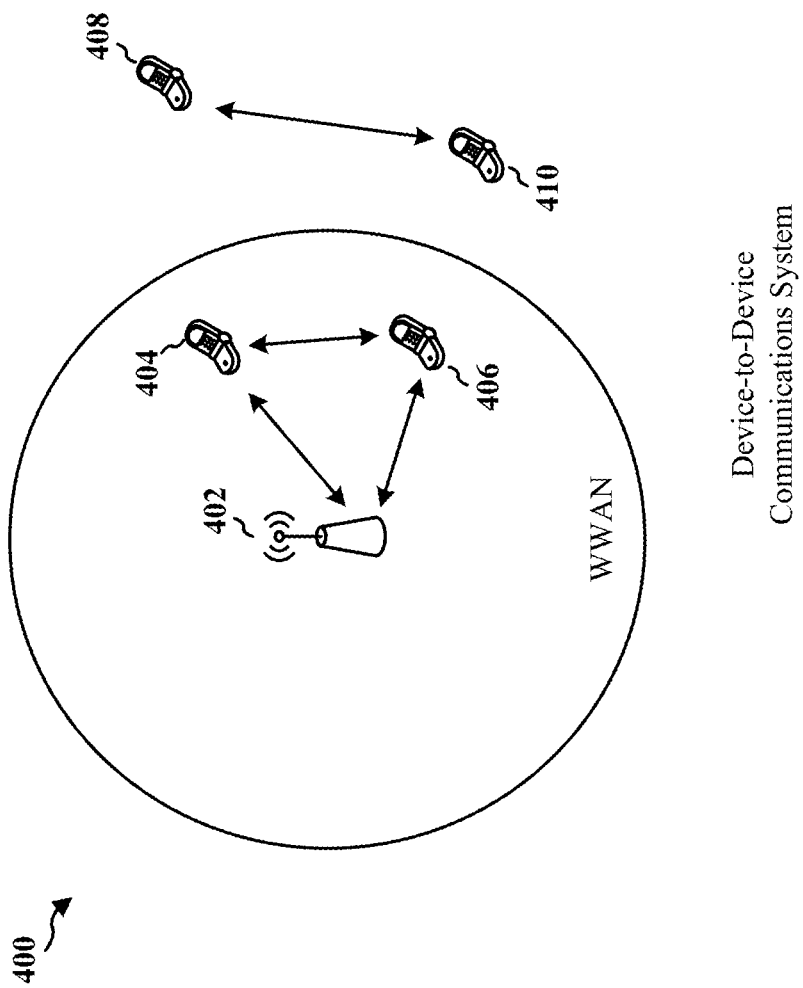
FIG. 4 is a diagram of a Non-Orthogonal Multiple Access (NOMA) communications system in accordance with the systems and methods described herein.

FIG. 4 is a diagram of a Non-Orthogonal Multiple Access (NOMA) communications system 400 in accordance with the systems and methods described herein. The NOMA communication system 400 includes a plurality of wireless devices 404, 406. The wireless devices 404, 406 are communicating with a base station, such as eNB 402. The wireless devices 404, 406 may each be a user equipment (UE). More particularly, one of the wireless devices 404, 406 may be referred to as a base layer UE while the other wireless device 404, 406 may be referred to as an enhancement layer UE. For further discussion, assume wireless device 404 is a base layer device, and wireless device 406 is an enhancement layer UE.

NOMA is a system improvement for Third Generation Partnership Program (3GPP) Release 13. NOMA superimposes multiple users in the power domain. For example, signals for two users may occupy the same frequency. The signals from the two users may be at different power levels, however. In the two user example, one user's UE may be referred to as the base layer UE (e.g., wireless device 404) and another user's UE may be referred to an enhancement layer UE (e.g., wireless device 406).

An example NOMA communication system may directly decode the base layer UE, wireless device 404, treating an enhancement layer signal as interference. Enhancement layer UE, wireless device 406, may performance some type of interference cancellation of the base layer signal before decoding the enhancement layer signal.

In some examples, as described herein, a base layer UE may be a "legacy" device. A legacy UE may be a UE that is not preconfigured or is unconfigured for NOMA communication. In other words, the "legacy" UE is not specially designed to handle NOMA related signaling and NOMA reception. The legacy UE may function in a NOMA communication system despite the fact that the legacy UE is not preconfigured for NOMA communication because a base station, e.g., eNB 402, configures communications with the legacy UE in a way that is compatible with both the legacy UE, the enhancement layer UE, and with NOMA communication using the systems and methods described herein.

In some examples, a legacy UE may be a UE that was designed prior to the introduction of NOMA or prior to the use of NOMA. However, a legacy UE may also be a UE that was designed after to the introduction of NOMA that simply does not include the NOMA functionality. If wireless device 404 is a base layer device, wireless device 404 may also be a "legacy" device. Accordingly, wireless device 404 may be a UE that is not preconfigured for NOMA communication. Wireless device 404 may communicate within a NOMA communication (unknowingly) because the systems and methods described herein allow for a legacy UE to function within NOMA even though such a device is not designed for NOMA communication.

In some systems, both UEs, i.e., the base layer UE and the enhancement layer UE, may be UEs that are configured to process transmissions using NOMA. Various systems and methods described herein allow the base layer UE to be a legacy device. The legacy device will generally be any device that is not preconfigured for NOMA. It will be understood, however, that while the systems and methods described herein are configured to allow for the base layer UE to be a device that is not preconfigured for NOMA, these systems and methods generally maintain the ability for NOMA communication when both UEs, i.e., the base layer UE and the enhancement layer UE, are configured to process transmissions using NOMA.

Systems and methods that allow for a base layer device that is not configured for NOMA operation to be part of a NOMA communication may provide a higher chance for NOMA to be used. Systems and methods that allow the base layer UE to be a device that is not preconfigured for NOMA may be less restriction on the pairing because systems and methods that allow the base layer UE to be a device that is not preconfigured for NOMA do not require both UEs to be UEs preconfigured for NOMA operation. Accordingly, a wider variety of devices may participate in a NOMA communication system. Generally, while the systems and methods described herein allow for a legacy UE to be paired with a UE configured for NOMA operation, it will be understood that these systems and methods may also allow for both UEs to be UEs that are preconfigured for NOMA operation.

Some example systems and methods described herein may be related to reference signal design, e.g., cell specific reference signals (CRS) and demodulation-reference signal (DM-RS). Some example systems and methods described herein may be related to signaling design. Generally, however, no signaling changes are possible for legacy UE. The signaling in the UEs that are not preconfigured for NOMA may generally be fixed.

In some examples, the NOMA communication system 400 may use a cell specific reference signal. When a cell specific reference signal is used, a traffic power ratio may be signaled ahead of time for the wireless device 404, e.g., the legacy UE, the wireless device that is not preconfigured for NOMA. In some examples, signaling of the traffic power ratio may not apply to QPSK, however. When QPSK is used, there is generally no traffic power ratio restriction.

For NOMA operation, data resource elements of the base layer UE, which may be a legacy UE, may be overlayed with another layer of data for the enhancement layer UE. Accordingly, for NOMA operation, data resource elements of the base layer UE that is not preconfigured for NOMA may be overlayed with another layer of data for the enhancement layer UE. The overlay may occur while keep the cell specific reference signal "clean." In other words, no signals are overlayed on the frequency of the cell specific reference signal. Generally, the data resource element traffic power ratio of the UE that is not preconfigured for NOMA, e.g., the legacy UE, will follow the cell specific reference signal that was transmitted.

In one example system, a base station will generally not transmit more signals on a cell specific reference signal. (The cell specific reference signal is "clean.") Transmitting more signals on a cell specific reference signal may impact all UEs for channel estimation and channel quality indicator (CQI) generation.

One issue may be that a UE that is not preconfigured for NOMA has a less noisy channel for cell specific reference signal resource elements and a noisier channel for other data resource elements. In other words, at the UE that is not preconfigured for NOMA the channel for cell specific reference signal resource elements may be received with higher signal quality than the channel for other data resource elements. The UE that is not preconfigured for NOMA is not aware of data resource element quality degradation, however.

In order to limit performance losses, in some examples, a base station may restrict a legacy UE. For example, the legacy UE, e.g., a UE that is not preconfigured for NOMA, may be restricted to use a Modulation and Coding Scheme (MCS) with QPSK for this scenario. Using QPSK may limit the performance loss from the lack of information on the degraded channel.

In some examples, an enhancement layer UE, e.g., wireless device 406, may use the same cell specific reference signal for demodulation, but will use a separate traffic power ratio for demodulating signals intended for the enhancement layer UE. It will be understood that the enhancement layer UE is "aware" of the base layer traffic power ratio. The enhancement layer UE may receive signaling related to the base layer traffic power ratio so that base layer signals may be properly canceled.

In some examples, the NOMA communication system 400 may be based on demodulation-reference signals. As described herein, communication systems based on demodulation-reference signals may include two options. The first option may generally be similar to the cell specific reference signal based design discussed above.

When a demodulation-reference signal is used, for a UE that is not preconfigured for NOMA, e.g., the legacy UE, the traffic power ratio may be 0 dB. Generally, this may remain unchanged. Under NOMA operation, the data resource elements of the UE that is not preconfigured for NOMA, e.g., legacy base layer UE, may be overlaid with a data resource element of an enhancement layer UE.

The common demodulation-reference signal may be shared between the two UEs in some examples. The traffic power ratio of the base layer UE over the shared demodulation-reference signal may be 0 dB.

In some examples, the traffic power ratio of the enhancement layer UE may be signaled to the enhancement layer UE. The signaling of the traffic power ratio of the enhancement layer UE may either be implicitly (e.g., in CEMA) or explicitly with signaling using, for example, Packet Data Control Channel (PDCCH) or Radio Resource Control (RRC).

In some examples, the UE that is not preconfigured for NOMA, e.g., the legacy base layer UE, may receive a degraded data channel. The UE that is not preconfigured for NOMA is not aware of the degraded data channel, however. In some examples, the base station may restrict the UE that is not preconfigured for NOMA to use MCS with QPSK. Using QPSK may limit the performance loss.

In some examples, the enhancement layer UE may be preconfigured with the traffic power ratio for the base layer UE, which is 0 dB. Accordingly, no signaling is needed to transmit the traffic power ratio for the base layer UE. The enhancement layer UE may perform proper interference cancellation without such a transmission because the enhancement layer UE already has the information, i.e., the traffic power ratio for the base layer UE (e.g., 0 dB). The enhancement layer UE may demodulation its own signals with a self-traffic power ratio. The self-traffic power ratio may be implied or determined by modulation order split.

A second option based on demodulation-reference signals may address an issue with the first option based on demodulation-reference signals discussed above. One potential issue with the first option based on demodulation-reference signals discussed above is that for UEs that are not preconfigured for NOMA, e.g., legacy base layer UEs, the data resource element quality is worse than the demodulation-reference signal quality due to intra-cell interference. Accordingly, a second option introduces an enhancement layer demodulation-reference signal that overlaps with a legacy base layer UE demodulation-reference signal, i.e., the demodulation-reference signal intended for use by the UE that is not preconfigured for NOMA.

In some examples, the enhancement layer demodulation-reference signal may have the same power level as the enhancement layer data. Generally, the enhancement layer demodulation-reference signal may be lower power level than the legacy demodulation-reference signal. Additionally, the enhancement layer demodulation-reference signal uses a different pseudo-random sequence, so that the base layer UE interprets the enhancement layer demodulation-reference signal as noise and does not confuse the enhancement layer demodulation-reference signal with the base layer demodulation-reference signal, e.g., the legacy demodulation-reference signal. (It will be understood that in some cases, the base layer demodulation-reference signal will be transmitted to a NOMA configured UE, e.g., when two NOMA configured UEs are paired together.)

The enhancement layer demodulation-reference signal is separately sequenced and acts like noise for the base layer UE. The traffic power ratio of the base layer UE over the base layer demodulation-reference signal may be 0 dB. The traffic power ratio of the enhancement layer UE over the enhancement layer demodulation-reference signal may be 0 dB.

In some examples, the power ratio between the base layer and the enhancement layer demodulation-reference signal may be signaled to the enhancement layer UE. The signaling may be either implicitly (e.g., in CEMA) or explicitly with signaling using PDCCH or RRC.

The base layer UE may see a degraded data resource element and matching degraded demodulation-reference signal. The channel estimation and/or the interference estimation from the base layer demodulation-reference signal may match the channel seen at the data resource elements.

In some examples, the enhancement layer UE is aware of both the base layer demodulation-reference signal and the enhancement layer demodulation-reference signal. The enhancement layer UE may combined the two demodulation-reference signals together to perform the channel estimation (e.g., instead of using the enhancement layer demodulation-reference signal only, which is typically of a lower energy level). Because the traffic power ratio may be known for both data layers, the enhancement layer UE may be better able to perform interference cancellation for the base layer signal and the enhancement layer UE may be able to demodulation signal transmitted to it.

Among all the above designs, to allow UEs that are not preconfigured for NOMA, e.g., legacy UEs, to work in a NOMA communication network, the traffic power ratio for the base layer may follow the traffic power ratio selected for the base layer UE. If there are multiple spatial layers for the base layer, then the legacy design may uniformly split power across the spatial layers out of the total quota from the traffic power ratio. Another traffic power ratio may be used for the enhancement layer UE. The traffic power ratio for the enhancement layer UE defines the data to reference signal power ratio for the enhancement layer UE. The traffic power ratio for the enhancement layer UE may be signaling by radio resource control (RRC) or in downlink control information (DCI), in some examples.

When a uniform combined constellation for a shared spatial layer is used, in that spatial layer, the enhancement layer power may be determined by the base layer power and the modulation order split. If there are enhancement layer only spatial layers for the enhancement layer UE, then the total power for those enhancement layer only spatial layers may be calculated from the enhancement layer traffic power ratio and the enhancement layer power in the shared spatial layers. In some examples, across multiple enhancement layers, the power may be uniformly split, as discussed with respect to FIG. 5, below.

When a uniform combined constellation for shared spatial layers is not used, the enhancement layer traffic power ratio determines the total enhancement layer power. The enhancement layer power may be uniformly split across all spatial layers used to transmit an enhancement layer, as discussed with respect to FIG. 6, below.

Figure 5:
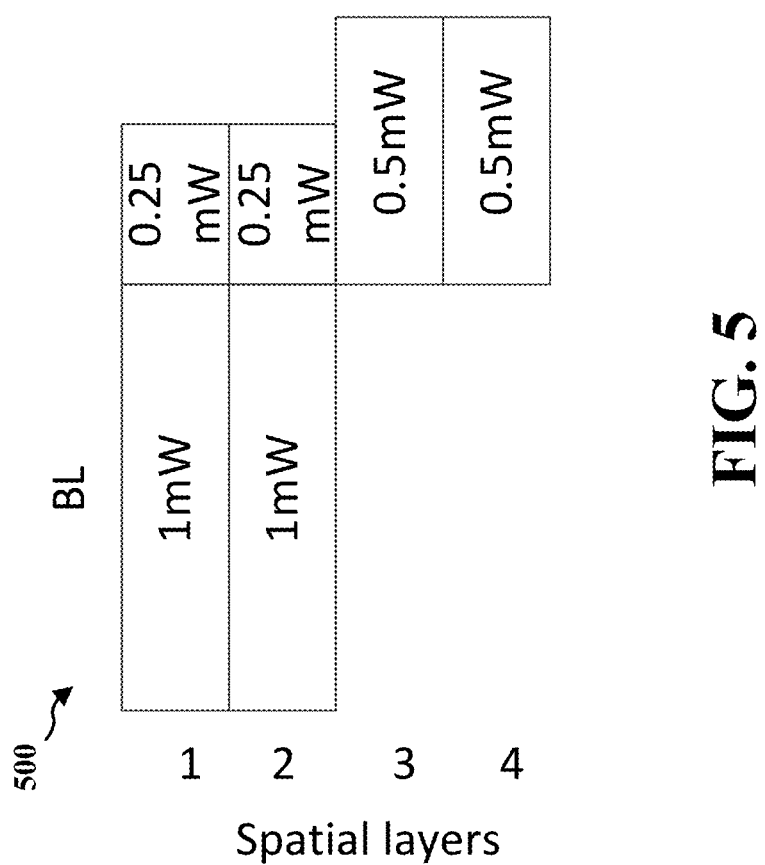
FIG. 5 is a diagram illustrating power for base layers and enhancement layers across multiple spatial layers.

FIG. 5 is a diagram illustrating power for base layers and enhancement layers across multiple spatial layers. FIG. 5 illustrates an example with a base layer that uses two spatial layers (1, 2) and an enhancement layer that uses four spatial layers (1, 2, 3, 4). The base layer traffic power ratio in the example indicates 2 mW total power for the base layer. As illustrated in FIG. 5, 1 mW is used for each layer to follow the legacy design of uniformly splitting across spatial layer 1 and spatial layer 2. For the shared spatial layers (1, 2), the enhancement layer UE may be programmed to be aware that QPSK is used by the base layer, and QPSK is used for the enhancement layer. From this, it may be inferred that the power split within a layer is 4:1. Accordingly, the enhancement layer power in these two layers will be 0.25 mW, i.e., ¼th of 1 mW. The enhancement layer UE also received the signaling that the enhancement layer UE's traffic power ratio translates to 1.5 mW total power. Accordingly, there is 1 mW total power in spatial layer 3, 4. (1.5 mW−(0.25 mW*2)=1 mW.) The 1 mW is split between layer 3 and layer 4 with 0.5 mW of power in each of spatial layers 3 and 4. (1 mW/2=0.5 mW.)

Figure 6:
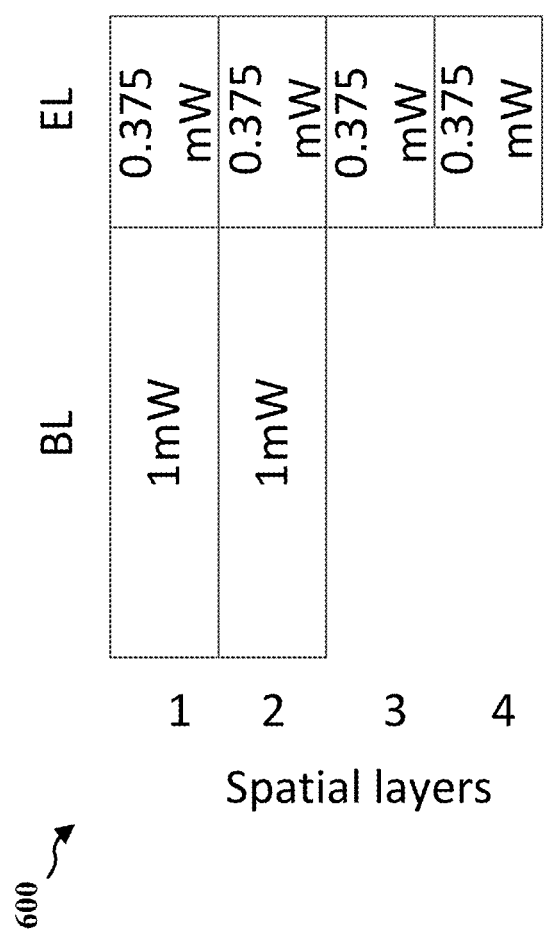
FIG. 6 is another diagram illustrating power for base layers and enhancement layers across multiple spatial layers.

FIG. 6 is another diagram illustrating power for base layers and enhancement layers across multiple spatial layers. In the illustrated example of FIG. 6, the base layer uses two spatial layers (1, 2), and the enhancement layer uses four spatial layers (1, 2, 3, 4). The base layer traffic power ratio indicates 2 mW total for the base layer. Accordingly, 1 mW is used for each of two layers to follow the legacy design of uniformly splitting across spatial layers. The enhancement layer UE may receive signaling that the enhancement layer UE's traffic power ratio translates to 1.5 mW total power. As illustrated in FIG. 6, without a modulation order split restriction, the enhancement layer UE is programmed to split uniformly across the four layers. Accordingly, the 1.5 mW power will be uniformly split across the four layers, which results in 0.375 mW power on each layer.

Figure 7:
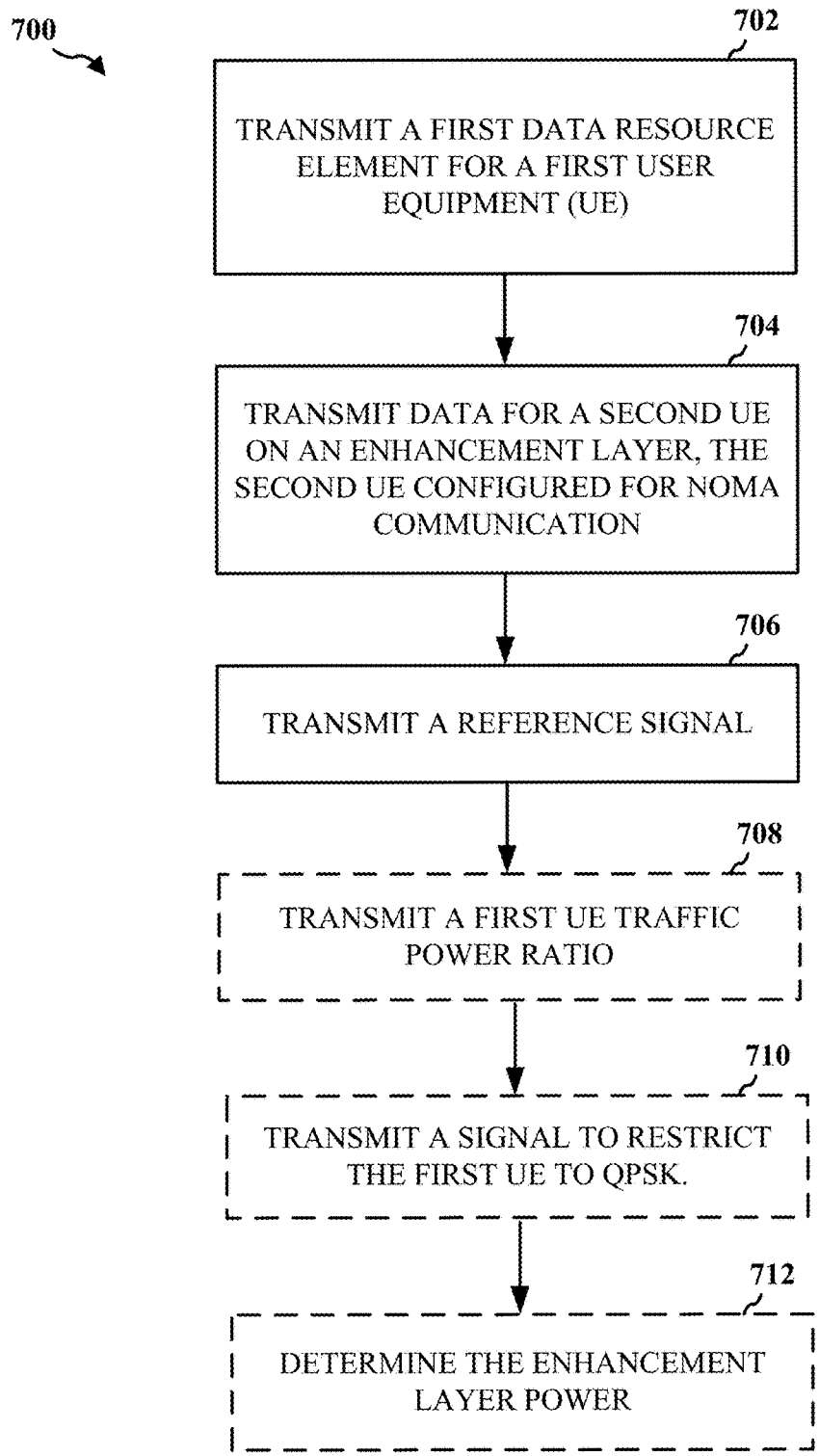
FIG. 7 is a flowchart of a method of wireless communication in accordance with the systems and methods described herein.

FIG. 7 is a flowchart 700 of a method of NOMA communication at a base station, in accordance with the systems and methods described herein. The method may be performed by an eNB (e.g., the eNB 102 of FIG. 1, the eNB 310 of FIG. 3, or the eNB 402 of FIG. 4). At block 702, the base station, e.g., eNB 102, 310, 402, transmits a first data resource element for a first UE on a base layer. (In this example, the "first UE" may be the base layer UE, which may be a UE that is not preconfigured for NOMA communication. In the example discussed with respect to FIG. 11, the "first UE" may be the UE that is configured for NOMA communication.) The first UE may be UE 104 of FIG. 1, UE 350 of FIG. 3, or one of the wireless devices 404, 406 of FIG. 4. (In the example of FIG. 4 wireless device 404 may be the first UE.) The first UE is unconfigured for NOMA communication. In other words, the first UE is not preconfigured for NOMA communication. The first UE is not specially designed to handle NOMA related signaling and NOMA reception. Additionally, in some examples, the first UE traffic power ratio relative to the first UE demodulation-reference signal may be 0 dB.

The traffic power ratio is the fraction of the total transmitted energy allocated to a signal, e.g., a scheduling signal or other signal making up a fraction of the total transmitted energy. The demodulation reference signal is a pilot signal. In some examples, the traffic power ratio for the first UE is 0 dB over the demodulation reference signal (which may also be measured in dB) and the second UE traffic power ratio is 0 dB over the enhancement layer demodulation reference signal.

At block 704, the base station, e.g., eNB 102, 310, 402, transmits data for a second UE on an enhancement layer. The second UE may be UE 104 of FIG. 1, UE 350 of FIG. 3, or one of wireless devices 404, 406 of FIG. 4. (In the example of FIG. 4 wireless device 406 was assumed to be the second UE.) The second UE is configured for NOMA communication. The base layer is overlayed with the enhancement layer. For example, in an overlay mode, an overall frequency band for, e.g., an LTE network, may be divided into two parts for the base layer and the enhancement layer. Additionally, in some examples, the data for the second UE may be a second data resource element for the second UE.

At block 706, the base station, e.g., eNB 102, 310, 402, transmits a reference signal. In one example, the reference signal may be a cell specific reference signal. In another example, the reference signal may be a demodulation-reference signal.

In some examples that use a demodulation-reference signal, the demodulation-reference signal may include a demodulation-reference signal for the first UE. In other examples that use a demodulation-reference signal, the demodulation-reference signal may actually include two demodulation-reference signals. For example, the demodulation-reference signal may include an enhancement layer demodulation-reference signal for the second UE and a base band demodulation-reference signal, e.g., a demodulation-reference signal for the first UE. In some examples, the second UE, the enhancement layer UE, may use both the enhancement layer demodulation-reference signal and the demodulation-reference signal for the first UE. The second UE enhancement layer demodulation-reference signal and the first UE demodulation-reference signal may overlap.

Optionally, at block 708, the base station, e.g., eNB 102, 310, 402, transmits a first UE traffic power ratio to be followed by the first UE when the first UE is a base layer UE in a NOMA communication. For example, the first UE traffic power ratio may be used by the first UE when the first UE is a base layer UE in a NOMA communication.

Optionally, at block 710, the base station, e.g., eNB 102, 310, 402, transmits a signal to restrict the first UE to a modulation and coding scheme that uses Quadrature Phase Shift Keying (QPSK). As described herein, using QPSK may limit errors at the first UE.

Optionally, at block 712, the base station, e.g., eNB 102, 310, 402, determines the enhancement layer power from a base layer power using a modulation order pair when a spatial layer is shared by a first UE and a second UE. The determination may be made when a combined constellation, for example, the enhancement layer and the spatial layer, is restricted to be uniformed, for example, the power of the enhancement layer and the spatial layer may be equal. The first UE may be a base layer UE and the second UE may be an enhancement layer UE.

Figure 8:
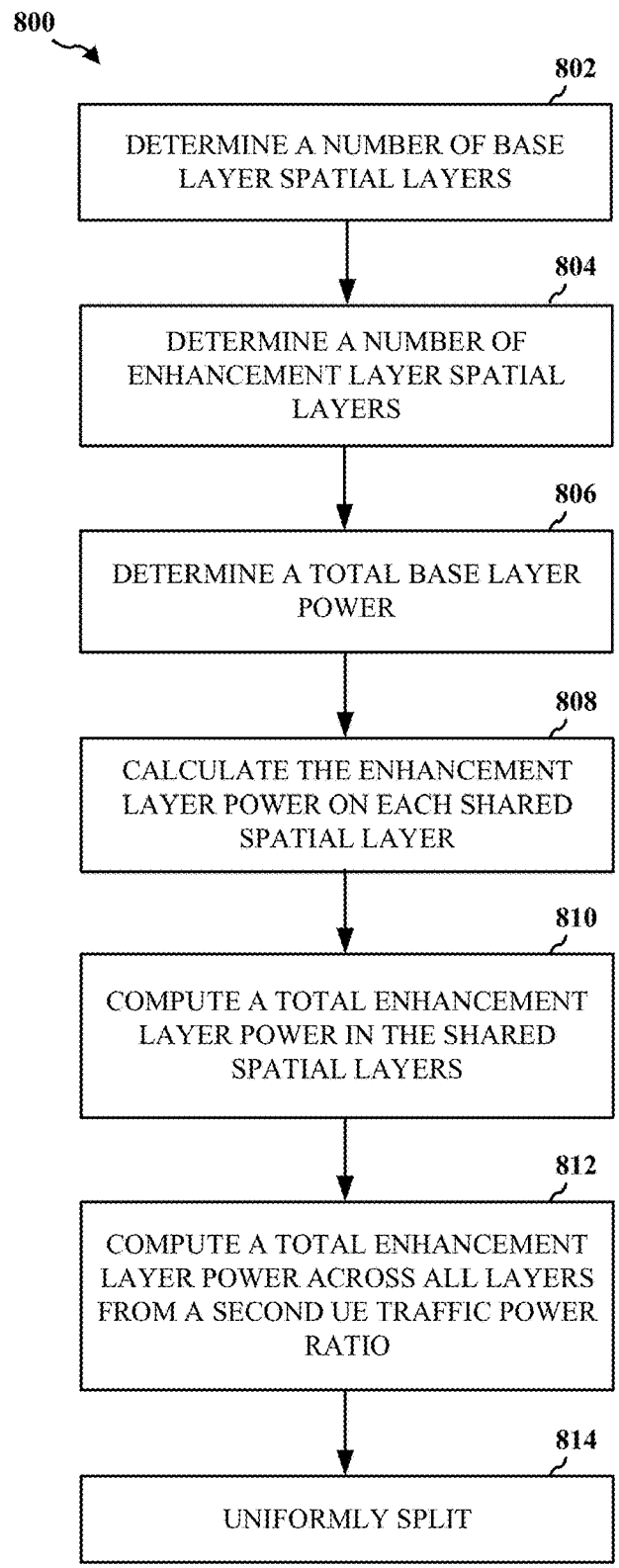
FIG. 8 is another flowchart of a method of wireless communication in accordance with the systems and methods described herein.

FIG. 8 is a flowchart 800 of a method of NOMA communication at a base station, in accordance with the systems and methods described herein. FIG. 8 illustrates a method for calculating an enhancement layer's spatial layer power.

At block 802, the base station, e.g., eNB 102, 310, 402 determines the number of base layer spatial layers. In the examples of FIGS. 5 and 6, the base layer has two spatial layers.

At block 804, the base station, e.g., eNB 102, 310, 402 determines the number of enhancement layer spatial layers. In the examples of FIGS. 5 and 6, the enhancement layer has four spatial layers.

At block 806, the base station, e.g., eNB 102, 310, 402 determines a total base layer power based on a traffic power ratio for the base layer. In the examples of FIGS. 5 and 6, the total base layer power is 2 mW.

At block 808, the base station, e.g., eNB 102, 310, 402 calculates the enhancement layer power on each shared spatial layer with a given modulation order pair of that spatial layer. Calculating the enhancement layer power on each shared spatial layer with a given modulation order pair of that spatial layer may be based on the enhancement layer transmit power on each shared spatial layer.

At block 810, the base station, e.g., eNB 102, 310, 402 computes the total enhancement layer power in the shared spatial layers. For example, the calculated enhancement layer power based on the enhancement layer transmit power on each shared spatial layer may be used to compute the total enhancement layer power in the shared spatial layer. For example, the enhancement layer transmit power on each shared spatial layer may be added together.

At block 812, the base station, e.g., eNB 102, 310, 402, computes the total enhancement layer power across all layers from the second UE traffic power ratio. In an example, the difference between the total enhancement layer power in the shared spatial layers and the total enhancement layer power across all layers from the second UE traffic power ratio is the total enhancement layer power available to the enhancement layer only spatial layers. In other words, the total enhancement layer power across all layers may be equal to the total enhancement layer power available to the enhancement layer only spatial layers plus the total enhancement layer power in the shared spatial layers. The total enhancement layer power across all layers may be equal to the total enhancement layer power available to the enhancement layer only spatial layers plus the total enhancement layer power in the shared spatial layers when the total enhancement layer power across all layers is only shared between the total enhancement layer power available to the enhancement layer only spatial layers and the total enhancement layer power in the shared spatial layers, At block 814, the base station, e.g., eNB 102, 310, 402, uniformly splits the total enhancement layer power available to the enhancement layer only spatial layers between all enhancement layer only spatial layers. For example, after the total enhancement layer power available to the enhancement layer only spatial layers is calculated, may be divided by the total number of enhancement layer only spatial layers and each of the total number of enhancement layer only spatial layers may use that amount of power.

Figure 9:
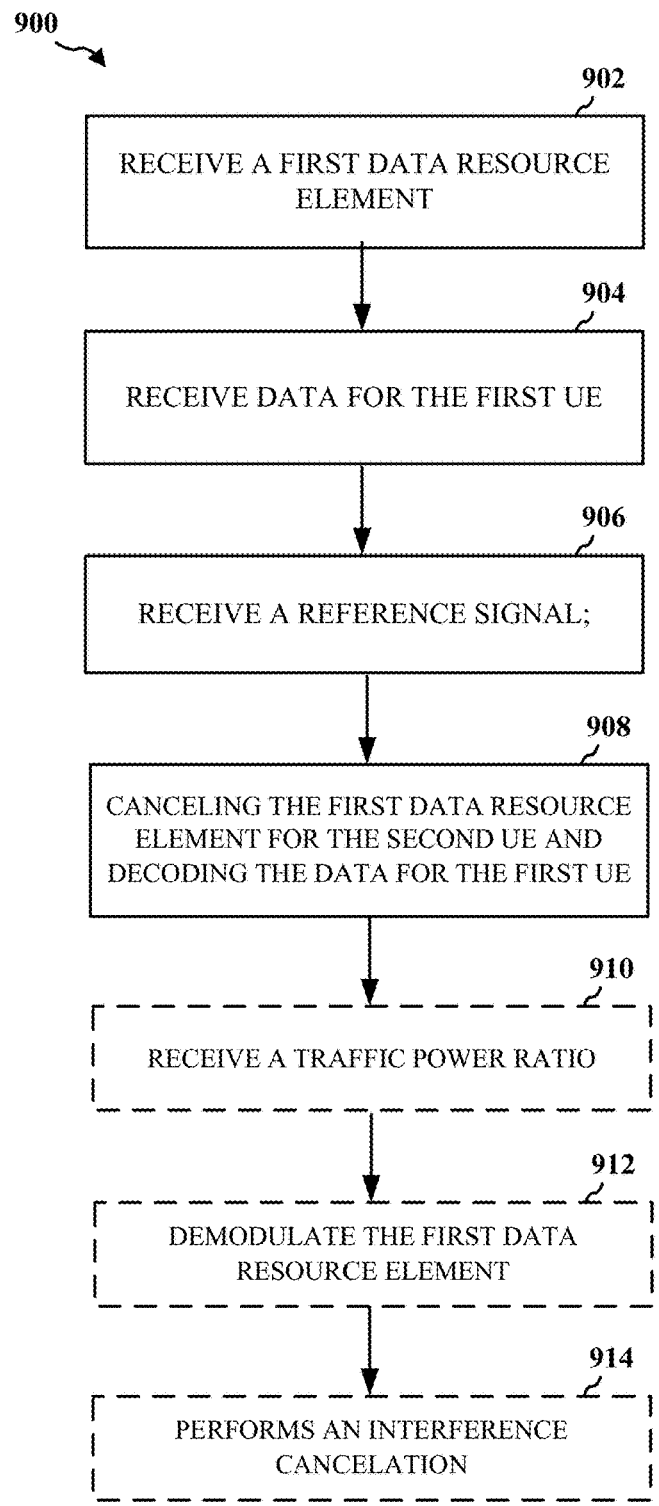
FIG. 9 is another flowchart of a method of wireless communication in accordance with the systems and methods described herein.

FIG. 9 is a flowchart 900 of a method of NOMA communication at a UE configured for NOMA communication, in accordance with the systems and methods described herein. The UE may be, for example, UE 104 of FIG. 1, UE 350 of FIG. 3, or one of wireless devices 404, 406 of FIG. 4. (In the example of FIG. 4, wireless device 406 was assumed to be the second UE.) The method illustrated in FIG. 9 is a method of NOMA communication at a first UE. The first UE may be configured for NOMA communication. (In this example the "first UE" may be the UE that is configured for NOMA communication. In the example discussed with respect to FIG. 11, the "first UE" may be the base layer UE, which may be a UE that is not preconfigured for NOMA communication.)

At block 902, the UE, e.g., UE 104, 350 or wireless device 404, 406 receives a first data resource element on a base layer. The first data resource element is configured for a second UE. The data for the second UE comprises a second data resource element for the second UE. The second UE is not preconfigured for NOMA communication.

At block 904, the UE, (for example, a second UE), e.g., UE 104, 350 or wireless device 404, 406 receives data for the first UE on an enhancement layer. The base layer is overlayed with the enhancement layer.

At block 906, the UE, e.g., UE 104, 350 or wireless device 404, 406 receives a reference signal. In some examples, the reference signal may be a cell specific reference signal. In other examples, the reference signal may be a demodulation-reference signal. In examples where the reference signal comprises a demodulation-reference signal, the demodulation-reference signal may be a demodulation-reference signal for the first UE. In some examples, the demodulation-reference signal may include two demodulation-reference signals. The two signals may be an enhancement layer demodulation-reference signal for the first UE and a demodulation-reference signal for the second UE. The enhancement layer demodulation-reference signal for the first UE and the demodulation-reference signal for the second UE may overlap. Some examples may use the enhancement layer demodulation-reference signal and the demodulation-reference signal for the second UE for at least one of channel estimation or interference estimation. For example, the power of the enhancement layer demodulation-reference signal and the power of the demodulation-reference signal for the second UE may be used for at least one of channel estimation or interference estimation. For example, the channel estimate may be based on the power of the enhancement layer demodulation-reference signal and the power of the demodulation-reference signal for the second UE. For example, the interference estimation may be based on a comparison of the power of the enhancement layer demodulation-reference signal and the power of the demodulation-reference signal for the second UE.

At block 908, the UE, e.g., UE 104, 350 or wireless device 404, 406 may cancel the first data resource element for the second UE. The UE may also decode the data for the first UE. When the UE cancels the first data resource element for the second UE, the first data resource element for the second UE is not used.

Optionally, at block 910, the UE, e.g., UE 104, 350 or wireless device 404, 406 receive a first UE traffic power ratio to be followed by the first UE when the first UE is a base layer UE in a NOMA communication.

Optionally, at block 912, the UE, e.g., UE 104, 350 or wireless device 404, 406 demodulates the first data resource element using the cell-specific reference signal and demodulates the data for a second UE using a separate traffic power ratio separate from the first UE traffic power ratio. For example, the separate traffic power ratio may be a separate traffic power ratio specifically for the second UE, e.g., a second UE traffic power ratio, while the first UE traffic power ratio may be for the first UE only. A traffic power ratio may be a fraction of the total transmitted energy allocated to a particular signal, such as a scheduling signal. Accordingly, the first UE traffic power ratio may be the fraction of the total transmitted energy allocated to a particular signal, such as a scheduling signal for the first UE, while the second UE traffic power ratio may be a fraction of the total transmitted energy allocated to a particular signal, such as a scheduling signal for the second UE.

Optionally, at block 914, the UE, e.g., UE 104, 350 or wireless device 404, 406 performs an interference cancellation. For example, the UE may be a first UE. Interference may be caused by a second UE. The first UE may have information for receiving data for the first UE. The first UE may also have information for receiving data for the second UE. Data transmitted to the second UE may cause interference at the first UE. The first UE may cancel the interference using data related to the information for receiving data for the second UE.

Figure 10:
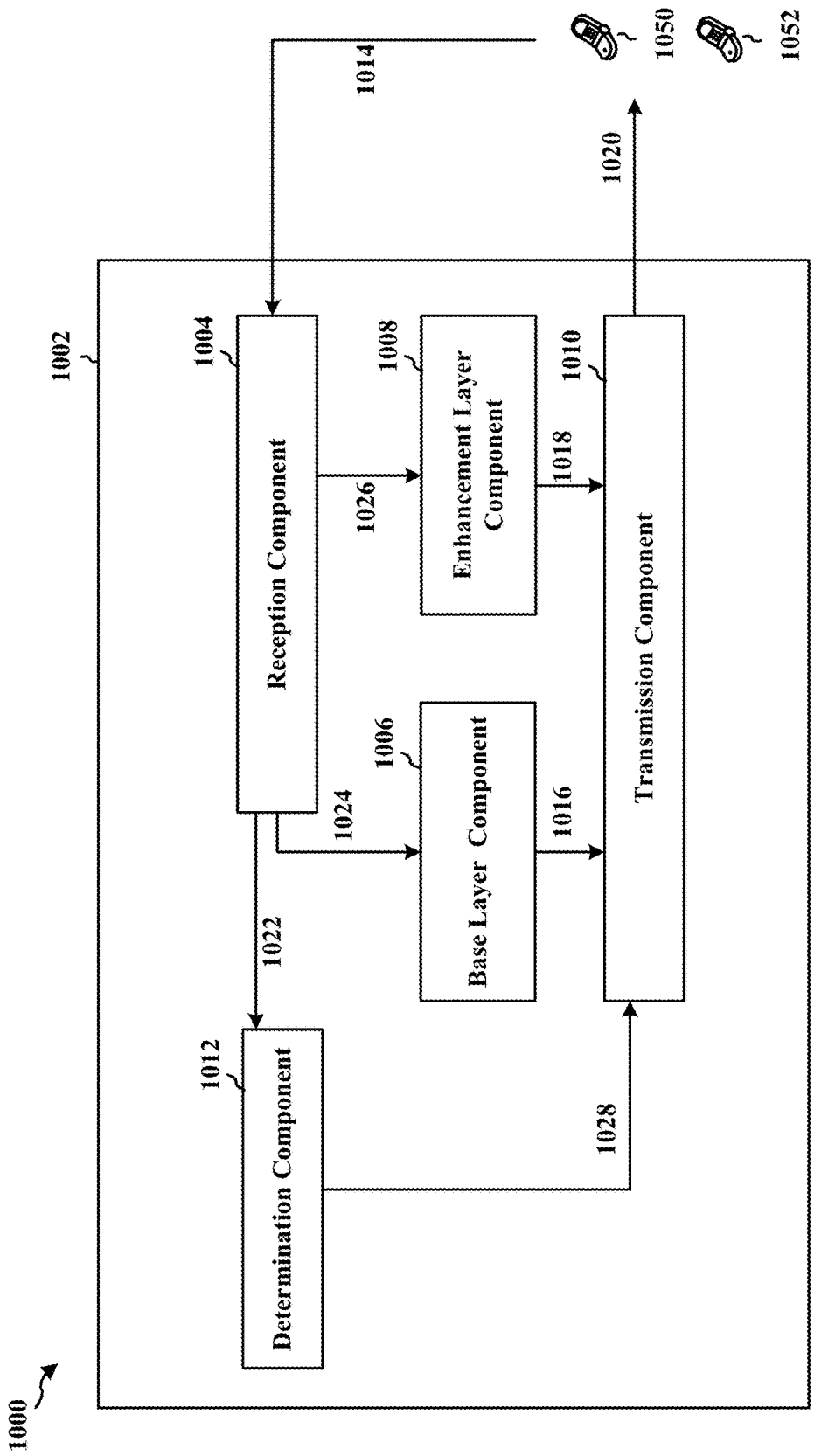
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be an eNB. The apparatus 1002 includes a reception component 1004 that may receive transmissions 1014, e.g., from a first UE 1050 or a second UE 1052, a base layer component 1006 that transmits a first data resource element 1016 for the first UE 1050 on a base layer, an enhancement layer component 1008 that transmits data 1018 for the second UE 1052 on an enhancement layer, and a transmission component 1010 that transmits signals 1020 including a reference signal. The transmission component may transmit a first UE traffic power ratio to be followed, i.e., a traffic power ratio to be used by the first UE when the first UE is a base layer UE in a NOMA communication. Additionally, the transmission component may transmit a signal to restrict the first UE to a modulation and coding scheme using QPSK.

In an example, the apparatus 1002 may further include a determination component 1012 that determines enhancement layer power from a base layer power using a modulation order pair when a spatial layer is shared by the first UE and the second UE. Determining enhancement layer power from a base layer power may be performed when a combined constellation to be uniform is restricted. The first UE 1050 may be a base layer UE. The second UE 1052 may be an enhancement layer UE. The reception component 1004 may pass received data 1022, 1024, 1026 such as data 1022, 1024, 1026 received from the first UE 1050 or the second UE 1014 by the reception component. from transmissions 1014 to the determination component 1012, the base layer component 1006, and/or the enhancement layer component 1008. The determination component may pass determinations 1028 made by the determination module to other components, such as the transmission component. The determination 1028 may be a determination of the enhancement layer power from a base layer power using the modulation order pair when the spatial layer is shared by the first UE and the second UE when the combined constellation to be uniform is restricted.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
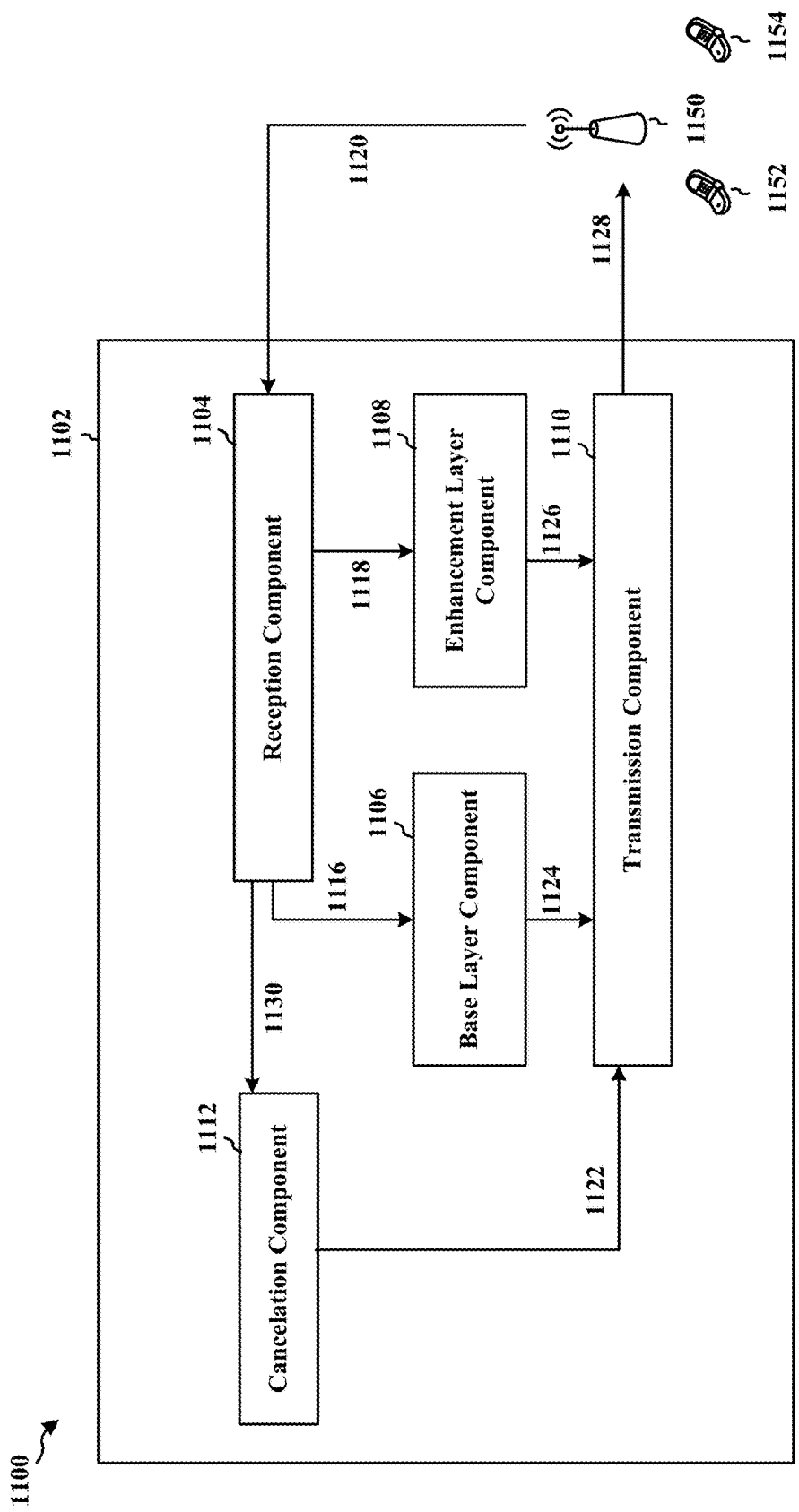
FIG. 11 is a diagram illustrating an example of a hardware implementation for an apparatus employing a processing system.

FIG. 11 is a conceptual data flow diagram 1100 illustrating the data flow between different means/components in an exemplary apparatus 1102. The apparatus may be a UE. The apparatus 1102 includes a reception component 1104 that receives signals 1120, for example, reference signals, a base layer component 1106 that receives a first data resource element 1116 on a base layer, an enhancement layer component 1108 that receives data 1118 for a first UE on an enhancement layer, a cancellation component 1112 that cancels the first data resource element for a second UE 1154, and a decoder component that decodes the data for a first UE 1152. The cancellation component 1112 may receive data 1130 from the reception component 1104 and communicate the cancellation 1122. The base layer component 1106 may communicate data 1124 to the transmission component 1110. The enhancement layer component 1108 may communicate data 1126 to the transmission component 1110. The transmission component 1110 may transmit data 1128 to one or more of the base station 1150, the first UE 1152, or the second UE 1154.

The reception component 1104 may receive a second UE 1154 traffic power ratio to be followed by the second UE when the second UE is a base layer UE in a NOMA communication. Additionally, the reception component 1104 may demodulate the first data resource element using the cell-specific reference signal and demodulating the data for the second UE 1154 using a separate traffic power ratio separate from the second UE 1154 traffic power ratio.

The apparatus may include additional components that perform each of the blocks of the algorithm in the aforementioned flowcharts of FIGS. 8-9. As such, each block in the aforementioned flowcharts of FIGS. 8-9 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
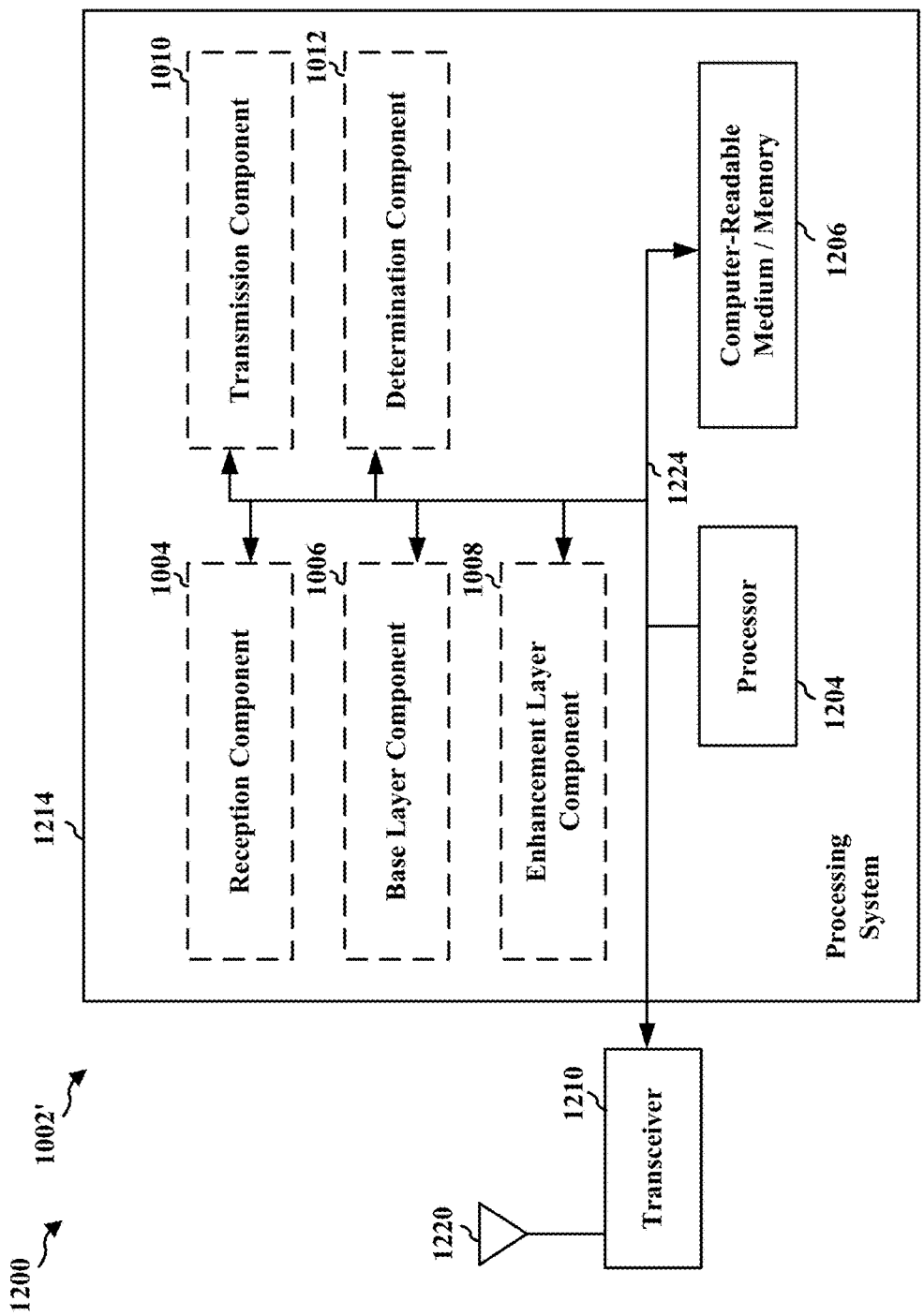
FIG. 12 is a conceptual data flow diagram illustrating the data flow between different means/components in an exemplary apparatus.

FIG. 12 is a diagram 1200 illustrating an example of a hardware implementation for an apparatus 1002' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1004, 1006, 1008, 1010, 1012 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214. Specifically, the reception component may receive data from one or more UEs. In addition, the transceiver 1210 receives information from the processing system 1214. Specifically, the transmission component transmits a first data resource element for a first UE on a base layer. The first UE may be unconfigured for NOMA communication. The transmission component may transmit data for a second UE on an enhancement layer. The second UE may be configured for NOMA communication. The base layer may be overlayed with the enhancement layer. Additionally, the transmission component may transmit a reference signal.

Based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1004, 1006, 1008, 1010, 1012. The components may be software components running in the processor 1204, resident/stored in the computer-readable medium/memory 1206, one or more hardware components coupled to the processor 1204, or some combination thereof. The processing system 1214 may be a component of the eNB 310 and may include the memory 376 and/or at least one of the TX processor 316, the RX processor 370, and the controller/processor 375.

In one configuration, the apparatus 1002/1002' for wireless communication includes means for transmitting a first data resource element for a first UE on a base layer. The first UE may be unconfigured for NOMA communication. Additionally, the apparatus 1002/1002' for wireless communication includes means for transmitting data for a second UE on an enhancement layer. The second UE may be configured for NOMA communication; wherein the base layer is overlayed with the enhancement layer. Further, the apparatus 1002/1002' for wireless communication includes means for transmitting a reference signal.

In one configuration, the apparatus 1002/1002' for wireless communication may include means for transmitting a first UE traffic power ratio to be followed by the first UE when the first UE is a base layer UE in a NOMA communication. In one configuration, the apparatus 1002/1002' for wireless communication may include means for transmitting a signal to restrict the first UE to a modulation and coding scheme that uses QPSK. In one configuration, the apparatus 1002/1002' for wireless communication may include means for determining enhancement layer power from a base layer power using a modulation order pair when a spatial layer is shared by the first UE and the second UE, when a combined constellation to be uniform is restricted. The first UE may include a base layer UE and the second UE may include an enhancement layer UE.

The aforementioned means may be one or more of the aforementioned components of the apparatus 1002 and/or the processing system 1214 of the apparatus 1002' configured to perform the functions recited by the aforementioned means. As described supra, the processing system 1214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The aforementioned means may be one or more of the aforementioned components of the apparatus 1002 and/or the processing system 1214 of the apparatus 1002' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
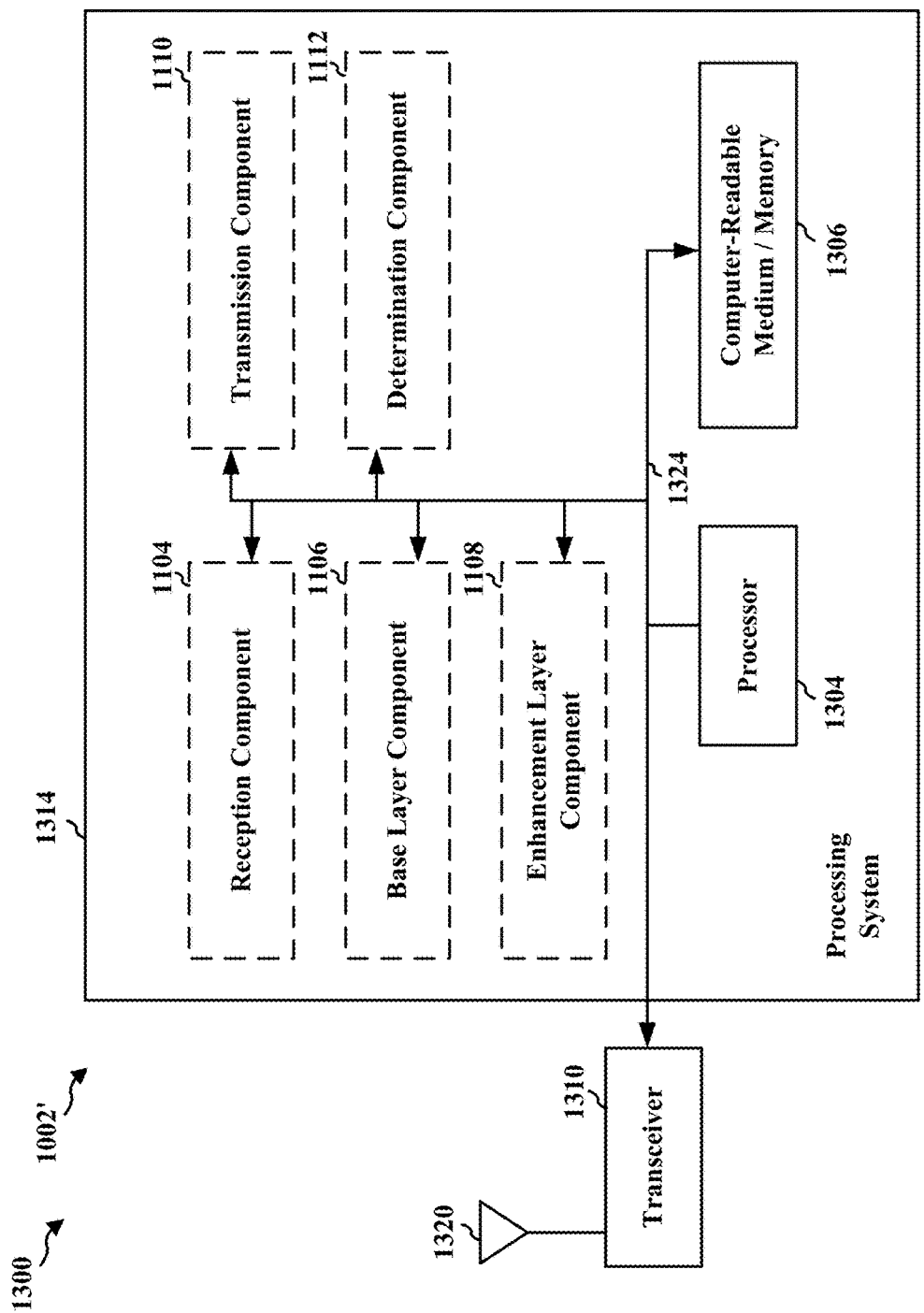
FIG. 13 is a diagram illustrating an example of a hardware implementation for an apparatus employing a processing system.

FIG. 13 is a diagram 1300 illustrating an example of a hardware implementation for an apparatus 1102' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1104, 1106, 1108, 1110, 112 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically, the reception component may receive a first data resource element on a base layer. The first data resource element may be configured for a second UE. The second UE may not be preconfigured for NOMA communication. The reception component may receive data for the first UE on an enhancement layer. The base layer may be overlayed with the enhancement layer. The reception component may receive a reference signal. In addition, the transceiver 1310 receives information from the processing system 1314. Specifically, the transmission component may transmit data to base stations or other UEs.

Based on received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1104, 1106, 1108, 1110, 1112. The components may be software components running in the processor 1304, resident/stored in the computer-readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1102/1102' for wireless communication includes means for receiving a first data resource element on a base layer. The first data resource element configured for a second UE. The second UE is not preconfigured for NOMA communication. The apparatus 1102/1102' for wireless communication includes means for receiving data for the first UE on an enhancement layer. The base layer is overlayed with the enhancement layer. Additionally, the apparatus 1102/1102' for wireless communication includes means for receiving a reference signal. Further, the apparatus 1102/1102' for wireless communication includes means for canceling the first data resource element for the second UE and decoding the data for the first UE.

In other examples, the apparatus 1102/1102' for wireless communication may include means for receiving a second UE traffic power ratio to be followed by the second UE when the second UE is a base layer UE in a NOMA communication.

In other examples, the apparatus 1102/1102' for wireless communication may include means for demodulating the first data resource element using the cell-specific reference signal and demodulating the data for the second UE using a separate traffic power ratio separate from the second UE traffic power ratio.

The aforementioned means may be one or more of the aforementioned components of the apparatus 1102 and/or the processing system 1314 of the apparatus 1102' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of Non-Orthogonal Multiple Access (NOMA) communications at a base station, the method comprising:
    transmitting a first data resource element for a first User Equipment (UE) on a base layer, the first UE unconfigured for NOMA communication;
    transmitting data for a second UE on an enhancement layer, the second UE configured for NOMA communication, wherein the base layer is overlayed with the enhancement layer;
    transmitting a reference signal comprising a demodulation-reference signal, wherein the demodulation-reference signal comprises a first UE enhancement layer demodulation-reference signal and a second UE demodulation-reference signal, wherein the first UE enhancement layer demodulation-reference signal for the first UE and the second UE demodulation-reference signal overlap;
    using the first UE enhancement layer demodulation-reference signal and the second UE demodulation-reference signal for at least one of channel estimation or interference estimation.

2. The method of claim 1, wherein the reference signal comprises a cell-specific reference signal.

3. The method of claim 2, further comprising transmitting a first UE traffic power ratio to be followed by the first UE when the first UE is a base layer UE in a NOMA communication.

4. The method of claim 1, further comprising transmitting a signal to restrict the first UE to a modulation and coding scheme that uses Quadrature Phase Shift Keying (QPSK).

5. The method of claim 1, wherein a first UE traffic power ratio relative to a first UE demodulation-reference signal is 0 dB.

6. The method of claim 1, wherein a traffic power ratio for the first UE is 0 dB over the demodulation reference signal and the second UE traffic power ratio is 0 dB over the enhancement layer demodulation reference signal.

7. The method of claim 1, further comprising determining enhancement layer power from a base layer power using a modulation order pair when a spatial layer is shared by the first UE and the second UE, when a combined constellation to be uniform is restricted, wherein the first UE comprising a base layer UE and the second UE comprising an enhancement layer UE.

8. A method of Non-Orthogonal Multiple Access (NOMA) communications at a first User Equipment (UE), the first UE configured for NOMA communication, the method comprising:
    receiving a first data resource element on a base layer, the first data resource element configured for a second UE, the second UE not preconfigured for NOMA communication;
    receiving data for the first UE on an enhancement layer, the base layer overlayed with the enhancement layer;
    receiving a reference signal comprising a demodulation-reference signal, wherein the demodulation-reference signal comprises a first UE enhancement layer demodulation-reference signal and a second UE demodulation-reference signal, wherein the first UE enhancement layer demodulation-reference signal for the first UE and the second UE demodulation-reference signal overlap;
    using the first UE enhancement layer demodulation-reference signal and the second UE demodulation-reference signal for at least one of channel estimation or interference estimation; and
    canceling the first data resource element for the second UE and decoding the data for the first UE.

9. The method of claim 8, wherein the reference signal comprises a cell specific reference signal.

10. The method of claim 9, further comprising receiving a second UE traffic power ratio to be followed by the second UE when the second UE is a base layer UE in a NOMA communication.

11. The method of claim 10, further comprising demodulating the first data resource element using the cell specific reference signal and demodulating second data for the second UE using a separate traffic power ratio separate from the second UE traffic power ratio.

12. The method of claim 8, wherein the demodulation-reference signal comprises a first UE demodulation-reference signal.

13. A base station for Non-Orthogonal Multiple Access (NOMA) communications, comprising:
    a memory; and
    at least one processor coupled to the memory and configured to:
        transmit a first data resource element for a first User Equipment (UE) on a base layer, the first UE unconfigured for NOMA communication;
        transmit data for a second UE on an enhancement layer, the second UE configured for NOMA communication, wherein the base layer is overlayed with the enhancement layer;

transmit a reference signal; and determine enhancement layer power from a base layer power using a modulation order pair when a spatial layer is shared by the first UE and the second UE, when a combined constellation to be uniform is restricted, wherein the first UE comprises a base layer UE and the second UE comprises an enhancement layer UE.

14. The base station of claim 13, wherein the reference signal comprises a cell specific reference signal.

15. The base station of claim 14, the processor further configured to transmit a traffic power ratio for the first UE to be followed by the first UE when the first UE is a base layer UE in a NOMA communication.

16. The base station of claim 13, the processor further configured to transmit a signal to restrict the first UE to a modulation and coding scheme that uses Quadrature Phase Shift Keying (QPSK).

17. The base station of claim 13 wherein the reference signal comprises a demodulation-reference signal.

18. The base station of claim 17, wherein a first UE traffic power ratio divided by a demodulation-reference signal for the first UE is 0 dB.

19. The base station of claim 17, wherein the demodulation-reference signal comprises a second UE enhancement layer demodulation-reference signal and a first UE demodulation-reference signal, wherein the second UE enhancement layer demodulation-reference signal and the first UE demodulation-reference signal.

20. The base station of claim 17, wherein a traffic power ratio for the first UE is 0 dB over the demodulation reference signal and the second UE traffic power ratio is 0 dB over an enhancement layer demodulation reference signal.

21. An apparatus, the apparatus comprising a first User Equipment (UE) configured for NOMA communication, the first UE comprising:

a memory; and at least one processor coupled to the memory and configured to:

receive a first data resource element on a base layer, the first data resource element configured for a second UE, the second UE not preconfigured for NOMA communication;

receive data for the first UE on an enhancement layer, the base layer overlayed with the enhancement layer;

receive a reference signal; and cancel the first data resource element for the second UE and decode the data for the first UE;

receive a traffic power ratio for the second UE to be followed by the second UE when the second UE is a base layer UE in a NOMA communication; and demodulate the first data resource element using the cell specific reference signal and demodulate second data for a second UE using a separate traffic power ratio separate from the second UE traffic power ratio.

22. The apparatus of claim 21, wherein the reference signal comprises a cell specific reference signal.

23. The apparatus of claim 21, wherein the reference signal comprises a demodulation-reference signal.

* * * * *